Patented Apr. 25, 1950

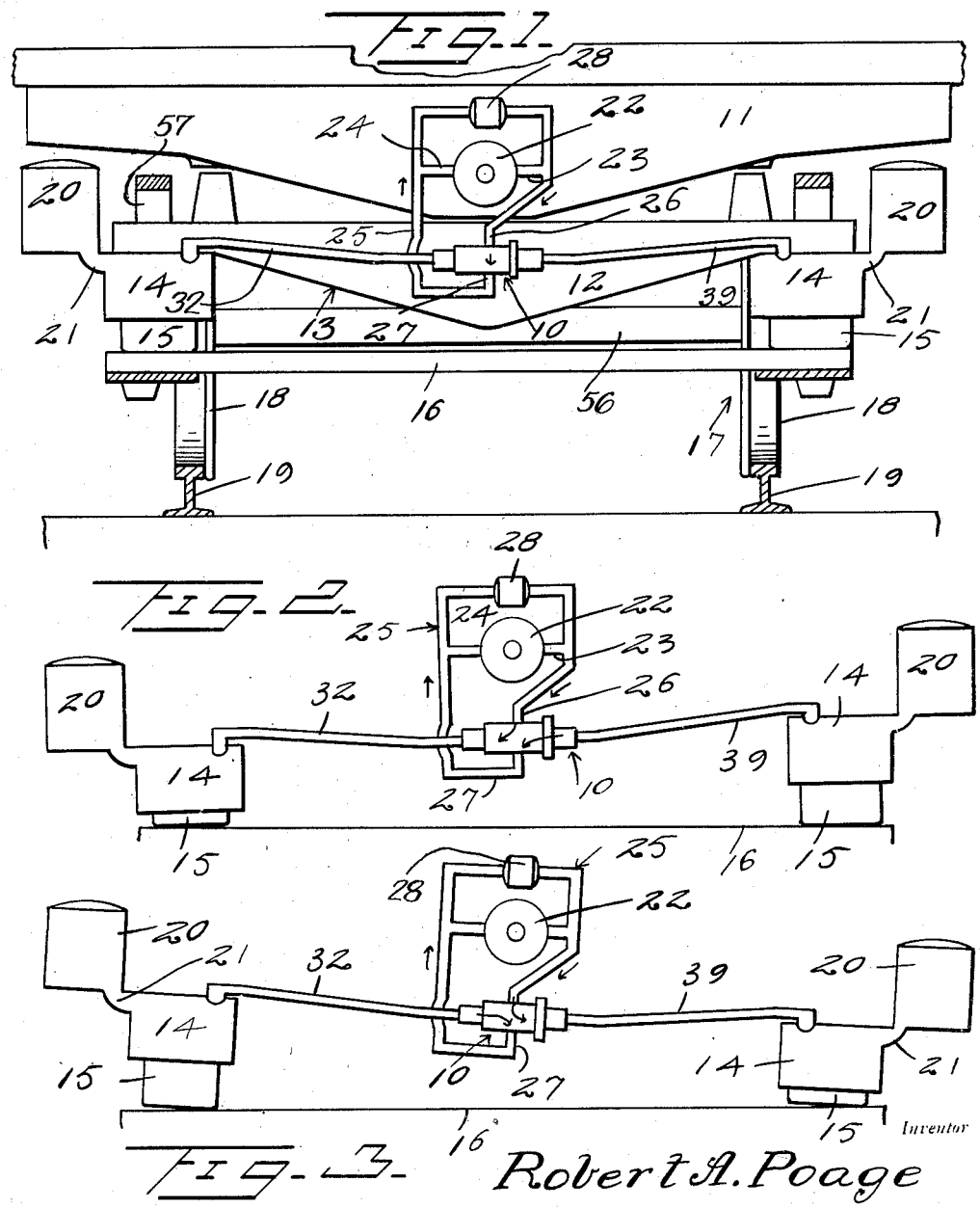

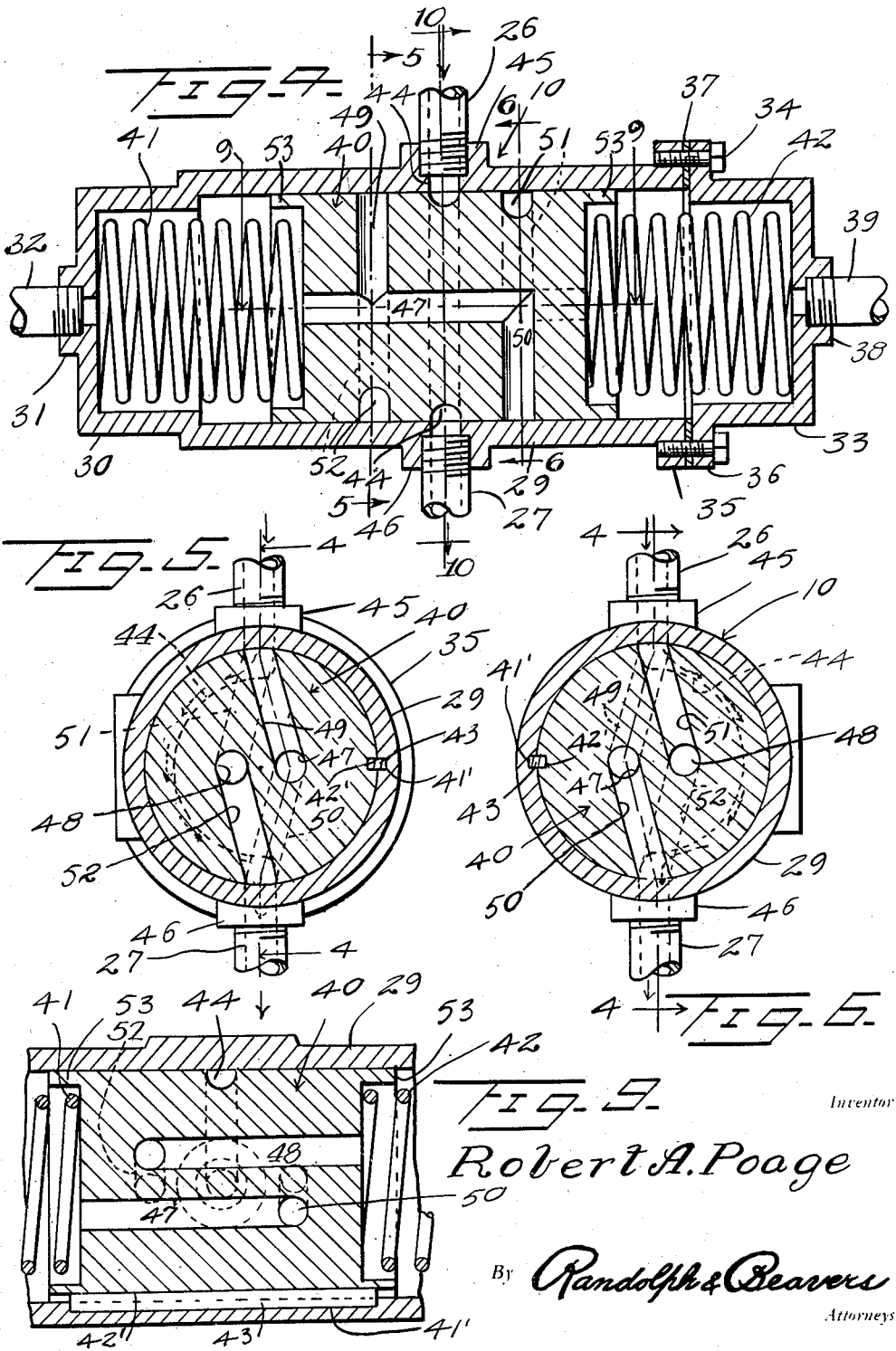

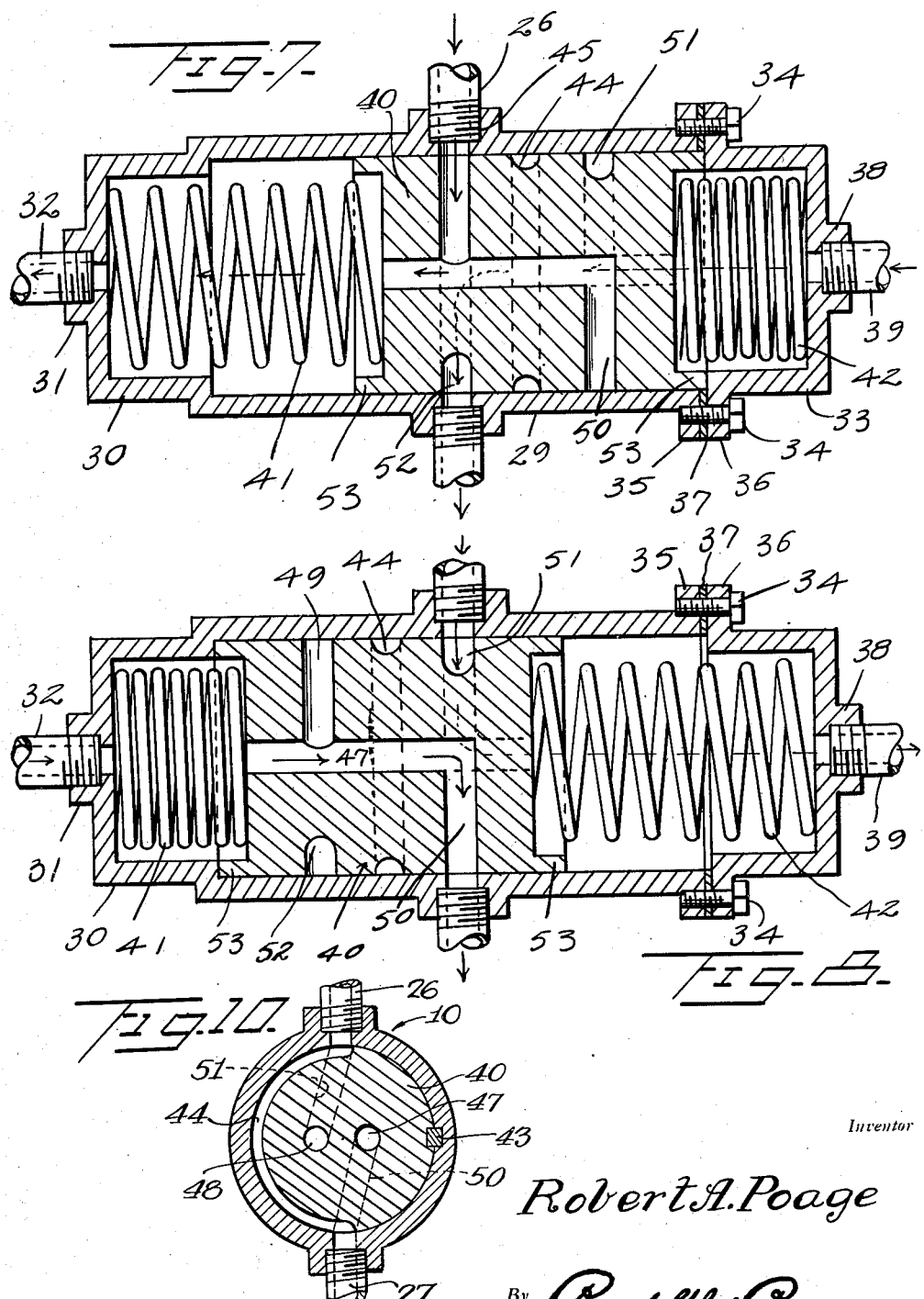

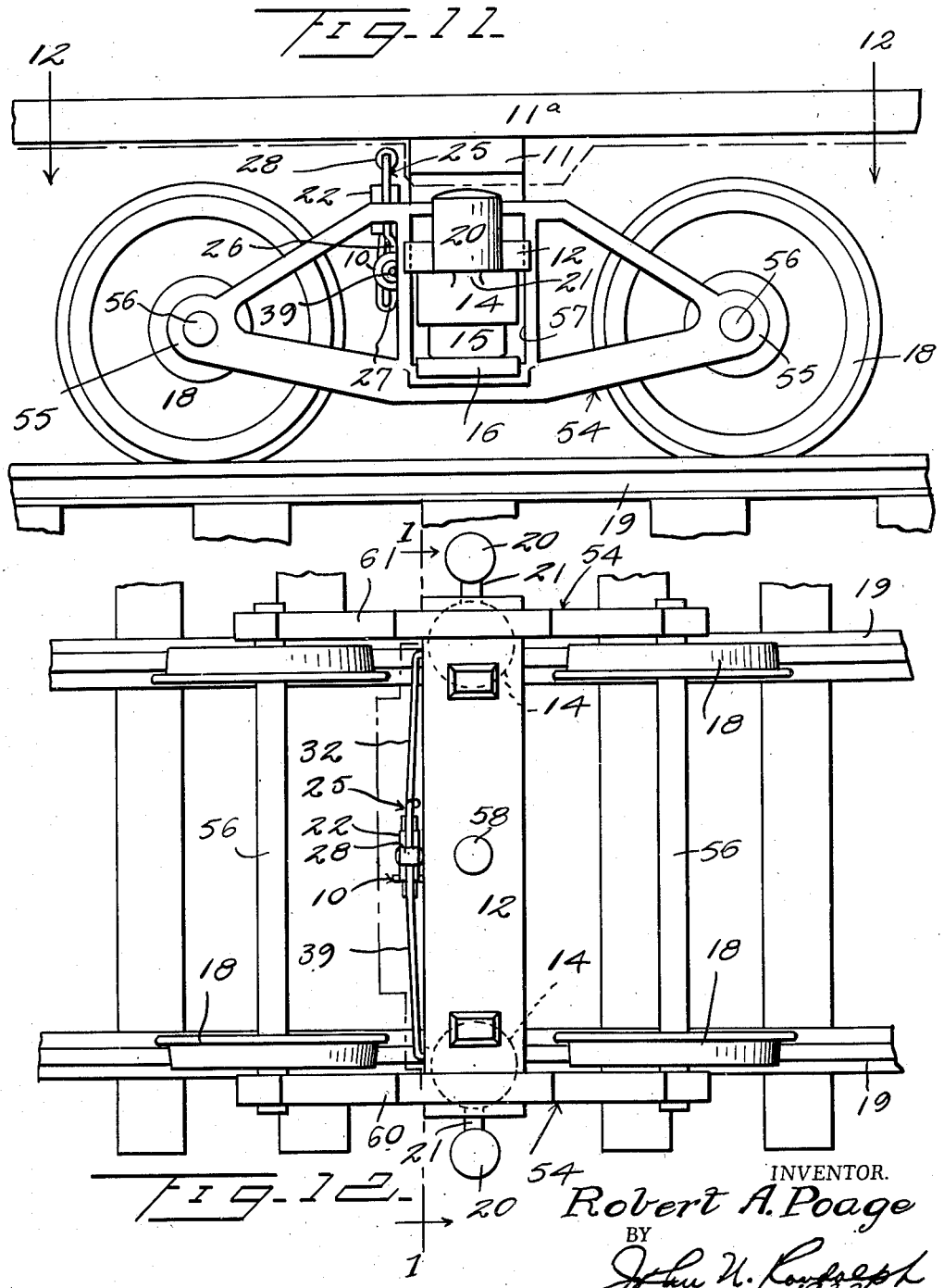

2,505,256

UNITED STATES PATENT OFFICE 2,505,256

HYDRAULIC BALANCING SYSTEM FOR VEHICLE BODIES

Robert A. Poage, Perry, Mo.

Application July 18, 1947, Serial No. 761,856

9 Claims. (Cl. 105—210)

This invention relates to an improved construction of valve for use with hydraulic balancing systems of tiltable bodies, such as railroad cars and has for its primary object to provide a balancing valve which will function automatically in response to an unbalanced condition of a tiltable body for by-passing a compressed medium through the valve and into a portion of the balancing system located at the low side of the load and at the same time for relieving pressure from the opposite side of the system for returning the load or body to a balanced position.

Still another object of the invention is to provide a balancing valve of extremely simple construction capable of being readily interposed in an hydraulic balancing system and which will function efficiently and accurately for maintaining the load supported by the cushioning means of the system at all times in a balanced condition and which will be responsive to the tilt resulting when a moving load or loaded vehicle body passes around a curve.

Still a further object of the invention is to provide a balancing valve having means whereby the compressed fluid may pass therethrough and around a by-pass without affecting the load supporting, cushioning means when the load is in a balanced position.

Various other objects and advantages of the invention will hereinafter become more fully apparent from the following description of the drawings, illustrating a preferred embodiment thereof, and wherein:

Figure 1 is an end elevational view showing the invention incorporated in an hydraulic balancing system untilized for supporting a railroad car relatively to a truck thereof and in a balanced position;

Figure 2 is a view of the system showing the parts in an unbalanced position and with the load, not shown, tilted toward the left;

Figure 3 is a similar view showing the system unbalanced and as it would appear with the load tilted toward the right thereof;

Figure 4 is an enlarged longitudinal sectional view taken substantially along a plane as indicated by the line 4—4 of Figure 5 and showing the balancing valve in an intermediate or normal position;

Figures 5 and 6 are cross sectional views of the balancing valve taken substantially along planes as indicated by the lines 5—5 and 6—6, respectively, of Figure 4;

Figure 7 is a view similar to Figure 4 showing the valve unbalanced and as it would appear in Figure 2;

Figure 8 is a similar view showing the valve as it would appear in Figure 3;

Figure 9 is a longitudinal, horizontal sectional view taken substantially along a plane as indicated by the line 9—9 of Figure 4, and Figure 10 is a cross sectional view of the balancing valve taken substantially along a plane as indicated by the line 10—10 of Figure 4; and Figure 11 is a side elevational view of the truck looking from right to left of Figure 1, and Figure 12 is a horizontal sectional view taken substantially along a plane as indicated by the line 12—12 of Figure 11.

Referring more specifically to the drawings, for the purpose of illustrating one preferred application and use of the balancing valve, designated generally 10 and comprising the invention, the numeral 11 designated generally a portion of a load carrying vehicle such as an item of railroad rolling stock having a truck bolster 12 on which it is supported and on which the platform of a vehicle body, a portion 11a of which is illustrated in Figure 11, is supported. An hydraulic balancing and cushioning system, designated generally 13 includes a pair of hydraulic cylinders 14 one of which is disposed beneath each end of the truck bolster 12 and which are provided with depending, reciprocally disposed pistons 15 which rest upon a spring plank 16 of a truck 17 of the car 11, which truck is provided with wheels 18 for engagement with rails 19. The pistons 15 are suitably sealed relatively to the cylindrical housing 14 by any suitable means such as rubber cups and a dome 20 for compressed air is disposed above the level of each cylinder 14 and connects to the upper portion thereof by a conduit 21 to provide therewith a combination hydraulic and pneumatic chamber. The hydraulic balancing system 13 also includes an hydraulic pump 22 having an outlet passage 23 extending from one side thereof and an inlet passage 24 communicating with its opposite side. An endless conduit, designated generally 25 has spaced portions connecting with the outer ends of the inlet and outlet conduits 23 and 24 and has a portion 26 forming an inlet to the valve 10 and a portion 27, disposed in alignment therewith and forming an outlet from said valve. The output of the hydraulic pump 22 and the pressure within the endless conduit 25 is controlled by a spring loaded bypass valve 28 which is interposed in a portion of the endless conduit 25. The entire hydraulic cushioning system 13 is preferably supported by the truck bolster 12.

The balancing valve 10, as best illustrated in Figures 4 to 9, inclusive, includes an elongated cylinder 29 having a slightly restricted portion 30 at one end thereof provided with a nipple 31 for detachably receiving an end of a conduit 32 which is thereby in communication with said end of the cylinder 29 and the opposite end of which conduit 32 communicates with the left hand cylinder 14, as seen in Figures 1, 2 and 3. The opposite end of the cylinder 29 is provided with a similarly shaped restricted portion 33 which is detachable by means of fastenings 34 which connect the flanged portions 35 and 36 of the cylinder 29 and its detachable portion 33. A sealing gasket 37 is preferably interposed between the flanges 35 and 36 to provide a liquid tight seal. The restricted end 33 is likewise provided with a nipple 38 for detachably receiving an end of a conduit 39, which communicates with said restricted end 33 of the cylinder 29 and the opposite end of which is connected to and communicates with the other or right-hand cylinder 14.

A piston 40 is reciprocally disposed for longitudinal movement within the cylinder 29 and said cylinder contains expansion coiled springs 41 and 42, disposed between the ends of the piston 40 and the ends of the restricted cylinder portions 30 and 33, respectively, and which are of substantially equal strength for normally retaining the piston 40 in its intermediate position of Figure 4.

As best seen in Figures 5 and 6, the piston 40 is slidably keyed to the cylinder 29 by a longitudinally extending key 43 which engages longitudinally disposed grooves 41' and 42' in cylinder 29 and piston 40, respectivley, to prevent rotation of the piston relatively to the cylinder. The piston 40, intermediate of its ends, is provided with an arcuate groove 44 extending one-half of the distance therearound and which, in the normal, intermediate position of the piston 40 has its ends in communication with ports 45 and 46 which are in the form of nipples and which are connected, respectively, to the inlet and outlet conduits 26 and 27 so that when the vehicle or load 11 is supported in a balanced position, as seen in Figure 1, the medium pumped by the pump 22 can flow unimpeded through the endless conduit 25 and transversely through the valve 10.

The piston 40 is provided with substantially parallel, longitudinally extending passages 47 and 48 which are laterally spaced from one another and which are disposed adjacent the horizontal center of the valve 10. The passage 47 has one end opening outwardly of the end of the valve 40 adjacent to the conduit 32 and said passage 47, adjacent said open end, is provided with an upwardly and inwardly extending branch passage 49 which is disposed in longitudinal alignment with the nipple or port 45 and normally longitudinally spaced therefrom and out of registry therewith. The opposite, inner end of the passage 47 terminates in a downwardly and inwardly extending passage 50 which opens outwardly of the periphery of the piston 40 in longitudinal alignment with the port or nipple 46 and normally out of registry therewith and longitudinally spaced therefrom.

The longitudinal passage 48 is provided with an end which opens outwardly of the end of the piston 40, adjacent to the conduit 39, and adjacent said end, the passage 48 is provided with an upwardly and inwardly extending branch passage 51 which opens outwardly of the top of the piston and on the opposite side of the nipple 45 to the passage 49 and in longitudinal alignment therewith. The inner end of the passage 48 is provided with a downwardly and inwardly extending passage 52 which opens outwardly of the bottom of the piston on the opposite side of the nipple 46 to the passage 50 and which is spaced substantially the same distance therefrom as said passage 50 and in longitudinal alignment therewith.

As previously stated, when the load or vehicle 11 is in a balanced position, as seen in Figure 1, the pump medium will flow transversely through the valve 10, passing through the groove or channel 44 between the ports or nipples 45 and 46. Should the load be tilted to the left, as seen in Figure 2, the excess pressure thus produced in the left hand cylinder 14 will compress the air in the dome 20 thereof and will also create an additional pressure in the conduit 32 which, with the pressure of the spring 41 will force the piston 40 from left to right of Figure 4 or to its position of Figure 7. When thus disposed, the pumped medium entering the valve 10 through the nipple or port 45 will flow into the passage 49, which is then in communication with the port 45, outwardly and to the left through the passage 47, through the left-hand end of the cylinder 29 and its nipple 31 into and through the conduit 32 for increasing the pressure on the piston 15. At the same time, the lateral passage 52 will have been moved into registry with the outlet nipple 46 and so that the pumped medium can flow from the conduit 39 into the right-hand end of the cylinder 29, longitudinally through the passage 48 and downwardly through the passage 52 back into the endless conduit 25 through its portion 27, to be pumped by the pump 22, if necessary, into the left-hand cylinder 14. It will be readily apparent that when the piston 15 of the left-hand cylinder 14 is returned to its normal position of Figure 1, that the valve piston 40 will return to its intermediate position of Figure 4. Should the load or body 11 tilt in the opposite direction or to the right, as seen in Figure 3, the piston 40 will shift, from its position of Figure 4 to the left or into its position of Figure 8 so that the pumped medium from the conduit portion 26 will flow into the passage 51, to the right through passage 48, through the right-hand end of the cylinder 29 and through conduit 39 to the right-hand cylinder 14. At the same time, the fluid from the left-hand cylinder 14 will flow through the conduit 32 inwardly through the left-hand end of the cylinder 29, through passage 47 and its downwardly extending lateral passage 50 back into the endless conduit 25 through the nipple 46.

It will thus be readily apparent that the valve 10 will effectively function to maintain the vehicle or load 11 in a balanced position, as seen in Figure 1 and will accomplish this result automatically including compensation for tilt resulting when the vehicle or load is traveling around a turn or curve.

It will be noted that the piston 40 has flanged ends 53 for engagement with the restricted cylinder ends 30 or 33, as seen in Figures 7 and 8, for limiting the sliding movement of said piston and so that it cannot slide beyond a position in which the ports or passages 49 and 52 or 50 and 51 are in registry with the nipples 45 or 46.

As seen in Figures 11 and 12, the truck 17 includes complementary side frames 54 having journals 55 at the ends thereof. The transversely aligned journals 55 receive the ends of axles 56 on which the wheels 18 are mounted. The side frames 54 are provided, intermediate of their ends, with vertically extending, substantially rectangular openings 57 the bottoms of which support the ends of the spring plank 16. The end portions of the truck bolster 12 are disposed for vertical movement in the upper portions of the openings 57. The truck bolster 12 has an upstanding centrally located king pin 58 which is received in a central recess or opening, not shown, of the member 11 to permit swivel movement of the members 11 and 12 relatively to one another.

Various modifications and changes are contemplated and may obviously be resorted to, without departing from the spirit or scope of the invention as hereinafter defined by the appended claims.

I claim as my invention:

1. In combination with a vehicle truck of a vehicle body, a hydraulic balancing and cushioning system for vehicle bodies including combination hydraulic and pneumatic cylinders located on the truck beneath the vehicle body and the load supported thereby and having downwardly extending reciprocating pistons, said cylinders being laterally spaced and disposed one on each side of the longitudinal axis of the vehicle body, conduit means connecting said cylinders, an endless conduit connected to the conduit means and having an hydraulic pump interposed therein and including a by-pass valve in said endless conduit; a balancing valve interposed between said endless conduit and the conduit means connected to said cylinders, said balancing valve including an elongated cylinder having the ends thereof connected to and communicating with the conduits leading to said first mentioned cylinders, a piston disposed for longitudinal sliding movement in the valve cylinder, spring means for normally retaining said piston in an intermediate position, said valve cylinder being connected intermediate of its ends at diametrically opposed points to portions of said endless conduit, said piston having a passage intermediate of its ends normally communicating with the connections to said endless conduit for the unimpeded passage of the pumped medium therethrough between portions of said endless conduit, and said piston having longitudinal and lateral passages arranged for movement into and out of registry with the connections of the valve cylinder to the endless conduit in response to an excess pressure in either of said first mentioned cylinders caused by a preponderance of the load being borne thereby and by which the piston is moved longitudinally of the valve cylinder for directing the pumped medium from the endless conduit toward one of the first mentioned cylinders and for drawing the pumped medium from the other of said cylinders for causing the pistons of said first mentioned cylinders to return to an intermediate, balanced position.

2. A hydraulic balancing and cushioning system as in claim 1, said longitudinal and lateral passages including spaced, substantially parallel longitudinal passages disposed in substantially the same horizontal plane, said longitudinal passages having remote ends opening outwardly of opposite ends of the piston and having opposite, closed ends, communicating with laterally, downwardly and inwardly extending passages, opening into the periphery of the piston in longitudinal alignment with one another and with one of the connections of the endless conduit to the valve cylinder and in alignment therewith and one on either side thereof, and said longitudinal passages being provided, adjacent their open ends with upwardly and inwardly extending branch passages opening into the periphery of the piston in longitudinal alignment with one another and with the other connection of the endless conduit to the valve cylinder and whereby the transversely aligned lateral passages will be simultaneously moved into registry with said endless conduit when the piston is moved longitudinally of the valve cylinder in response to an excess pressure in either of the first-mentioned cylinders.

3. A hydraulic balancing and cushioning system as in claim 1, and means for keying said valve piston to the valve cylinder for slidably and non-rotatably positioning the piston in said cylinder.

4. A hydraulic balancing and cushioning system as in claim 1, and stop means for limiting the longitudinal sliding movement of the piston relatively to the valve cylinder to prevent the piston from moving beyond a position in which its lateral passages will be in communication with said endless conduit.

5. A hydraulic balancing and cushioning system as in claim 1, means for keying said valve piston to the valve cylinder for sliding and non-rotatably positioning the piston in said cylinder, and stop means for limiting the longitudinal sliding movement of the piston relatively to the valve cylinder to prevent the piston from moving beyond a position in which its lateral passages will be in communication with said endless conduit.

6. A hydraulic balancing and cushioning system as in claim 1, said longitudinal and lateral passages including spaced, substantially parallel longitudinal passages disposed in substantially the same horizontal plane, said longitudinal passages having remote ends opening outwardly of opposite ends of the piston and having opposite, closed ends, communicating with laterally, downwardly and inwardly extending passages, opening into the periphery of the piston in longitudinal alignment with one another and with one of the connections of the endless conduit to the valve cylinder and in alignment therewith and one on either side thereof, and said longitudinal passages being provided, adjacent their open ends, with upwardly and inwardly extending branch passages opening into the periphery of the piston in longitudinal alignment with one another and with the other connection of the endless conduit to the valve cylinder and whereby the transversely aligned lateral passages will be simultaneously moved into registry with said endless conduit when the piston is moved longitudinally of the valve cylinder in response to a pressure in either of the first-mentioned cylinders, and stop means for limiting the longitudinal sliding movement of the piston relatively to the valve cylinder to prevent the piston from moving beyond a position in which its lateral passages will be in communication with said endless conduit.

7. A hydraulic vehicle-balancing system under hydraulic pressure throughout comprising, in combination, laterally spaced oppositely positioned vehicle body supporting cylinders with reciprocating pistons responsive to tilt of the body, said cylinders having air chambers, said cylinders being laterally spaced and adapted to be disposed one on each side of the longitudinal axis of the vehicle body and between the body and a truck thereof, a fluid circulating means for the system, and a directing valve inter-connecting said supporting cylinders and said circulating means, said directing valve being actuated solely by differentials of pressure in said oppositely disposed supporting-cushioning means caused by a tilting of the body toward one or the other of the supporting-cushioning means to permit equalization of pressure therein 8. A vehicle balancing system under hydraulic pressure throughout comprising, in combination, laterally spaced oppositely positioned vehicle body supporting cylinders with reciprocating pistons responsive to tilt of the body, said cylinders having cushioning air chambers, said cylinders being laterally spaced and adapted to be disposed one on each side of the longitudinal axis of the vehicle body and between the body and a truck thereof, a fluid circulating means for the system, and a directing valve inter-connecting said supporting cylinders and said circulating means, said directing valve being actuated solely by differentials of pressure in said oppositely disposed supporting-cushioning means caused by a tilting of the body forward toward one or the other of the supporting cushioning means to permit equalization of pressure therein and said directing valve being provided with a by-pass effective when said valve is in a neutral position.

9. A vehicle balancing system under hydraulic pressure throughout comprising, in combination, laterally spaced oppositely positioned vehicle body supporting cylinders with reciprocating pistons responsive to tilt of the body, said cylinders having cushioning air chambers, said cylinders being laterally spaced and adapted to be disposed one on each side of the longitudinal axis of the vehicle body and between the body and a truck thereof, a fluid circulating means for the system, and a directing valve inter-connecting said supporting cylinders and said circulating means, said directing valve being actuated solely by differentials of pressure in said oppositely disposed supporting-cushioning means caused by a tilting of the body toward one or the other of the supporting cushioning means to permit equalization of pressure therein and said cushioning air chambers being adapted to contain compressed air and being in communication with the supporting cylinders above the level of the connection of said cylinders with the directing valve.

ROBERT A. POAGE.

REFERENCES CITED

The following references are of record in the file of this patent:

UNITED STATES PATENTS

| Number | Name | Date |
|---|---|---|
| 1,870,484 | Basta | Aug. 9, 1932 |
| 1,974,171 | Bizzarri | Sept. 18, 1934 |
| 2,088,487 | Schoepf et al. | July 27, 1937 |
| 2,095,677 | Schoepf et al. | Oct. 12, 1937 |
| 2,121,936 | Thomas | June 28, 1938 |
| 2,141,592 | Clar et al. | Dec. 27, 1938 |
| 2,161,687 | Schoepf et al. | June 6, 1939 |
| 2,249,402 | Stefano | July 15, 1941 |

FOREIGN PATENTS

| Number | Country | Date |
|---|---|---|
| 818,803 | France | Oct. 4, 1937 |